United States Patent [19]

Tsuboi et al.

[11] Patent Number: 5,638,225
[45] Date of Patent: Jun. 10, 1997

[54] MAGNETIC DISC APPARATUS

[75] Inventors: Takehiko Tsuboi, Kawasaki; Toshihiko Matsuda, Higashine; Shoichi Shimizu, Kawasaki; Masako Kaizumi, Kawasaki; Hiroyuki Mase, Kawasaki, all of Japan

[73] Assignee: Fujitsu Limited, Kawasaki, Japan

[21] Appl. No.: 21,329

[22] Filed: Feb. 23, 1993

[30] Foreign Application Priority Data

Mar. 18, 1992 [JP] Japan ................................ 4-060817

[51] Int. Cl.$^6$ ................................................ G11B 5/02
[52] U.S. Cl. ............................ 360/27; 360/65; 360/45
[58] Field of Search ......................... 360/27, 45, 65, 360/63, 46

[56] References Cited

U.S. PATENT DOCUMENTS

| | | | |
|---|---|---|---|
| 4,564,869 | 1/1986 | Baumeister | 360/46 |
| 4,945,311 | 7/1990 | Smith | 328/167 |
| 5,008,761 | 4/1991 | Nishiyama et al. | 360/27 X |
| 5,068,754 | 11/1991 | Garde | 360/45 |
| 5,087,992 | 2/1992 | Dahandeh et al. | 360/31 |
| 5,107,378 | 4/1992 | Cronch et al. | 360/45 |
| 5,120,985 | 6/1992 | Kimura | 307/261 |
| 5,163,003 | 11/1992 | Kimura | 360/45 |

FOREIGN PATENT DOCUMENTS

| | | | |
|---|---|---|---|
| 0198514 | 11/1984 | Japan | 360/65 |
| 62-3411 | 1/1987 | Japan . | |
| 62-75976 | 4/1987 | Japan . | |
| 63-177362 | 7/1988 | Japan . | |
| 2154379 | 6/1990 | Japan . | |
| 0012802 | 1/1991 | Japan | 360/65 |
| 04134706 | 5/1992 | Japan . | |

OTHER PUBLICATIONS

Transactions on Magnetics, "An Improved Pulse–Slimming Method for Magnetic Recording", Richard C. Schneider, vol. Mag–11, No. 5, Sep. 1975.

IBM Technical Disclosure Bulletin, "Dasd Recording Sub–System Parameter Optimization by Head Radius", IBM Corp 1990, vol. 33, No. 3A, Aug. 1990.

IBM Technical Disclosure Bulletin, "Analog Adaptive Equalizer with Enhanced Self–Adjustability", IBM Corp 1990, vol. 33, No. 2, Jul. 1990.

Dictionary of Computers, Information Processing, and Telecommunications, 2d. Ed., by Jerry Rosenberg, ©1987 John Wiley & Sons, Inc. NY, p. 544.

"Implementation of PRML in a Rigid Disk Drive", J.D. Coker, R.L. Galbraith, G.J. Kerwin, J.W. Raw, P.A. Ziperovich, IEEE Transactions on Magnetics, vol. 27, No. 6, Nov., 1991.

*Primary Examiner*—Andrew L. Sniezek
*Attorney, Agent, or Firm*—Greer, Burns & Crain, Ltd.

[57] ABSTRACT

A magnetic disc apparatus using an electric filter for waveform equalization of a read signal is provided. The optimum parameters are set for every head and the writing and reading operations are executed on the basis of the optimum characteristics. At the start of the use of the apparatus, the control information of the circuit parameters previously recorded on a magnetic recording medium is read out, thereby forming a set value table in which the optimum values of the circuit parameters including at least the electric filter have been stored every magnetic head. After the table was formed, prior to the writing or reading operation, the contents of the set value table corresponding to the designated magnetic head are read out and the circuit parameters of the circuit section including the electric filter are controlled and optimized on the basis of the contents read out.

17 Claims, 15 Drawing Sheets

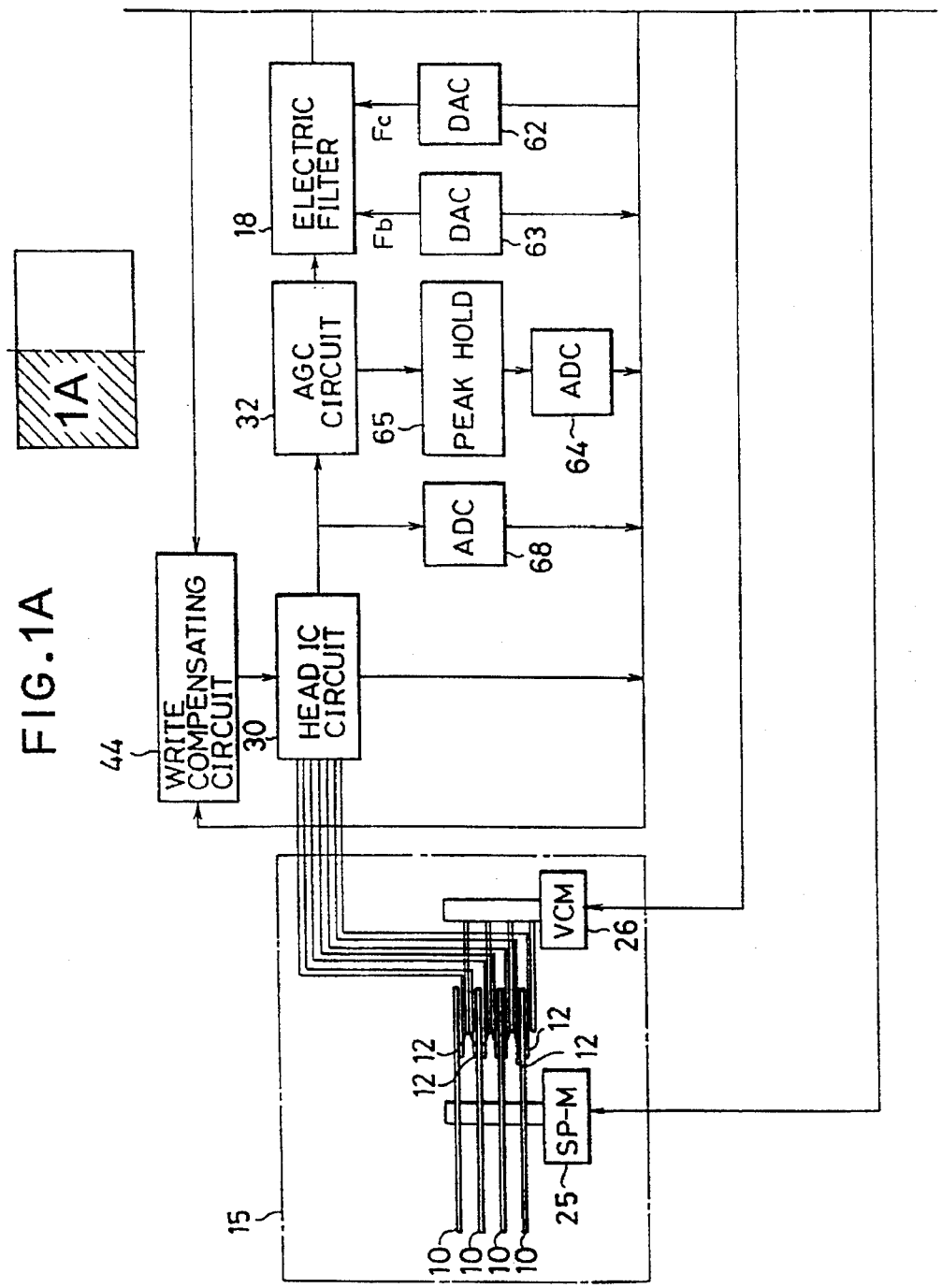

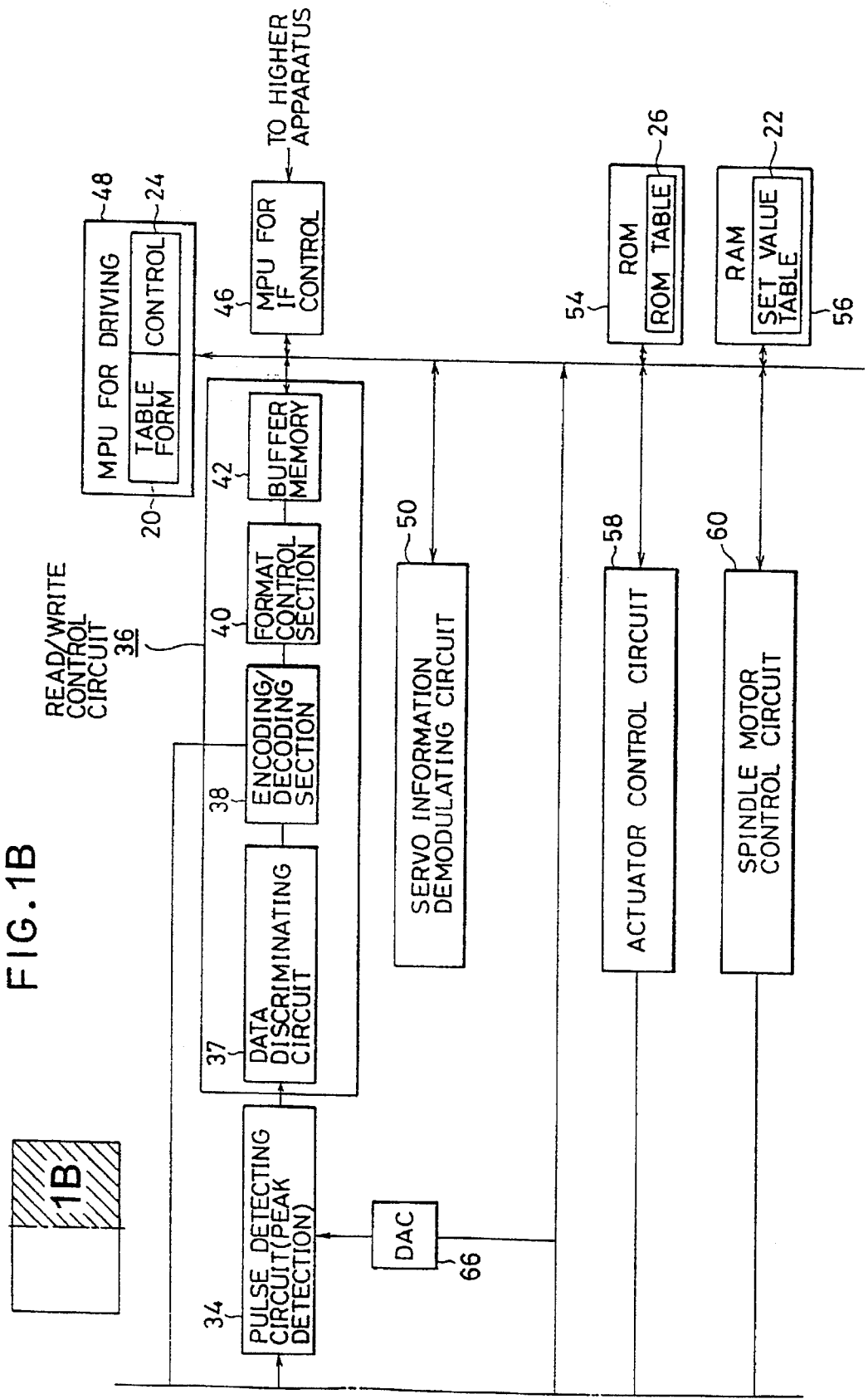

FIG.8

| DATA No. | FILTER CONSTANT | DETECTION LEVEL VOLTAGE | OTHERS |
|---|---|---|---|
| 0 | Fc0, Fb0 | V0 | |
| 1 | Fc1, Fb1 | V1 | |
| 2 | Fc2, Fb2 | V2 | |
| 3 | Fc3, Fb3 | V3 | |
| ⋮ | ⋮ | ⋮ | |
| M | FcM, FbM | VM | |

Fc: CUT-OFF FREQUENCY
Fb: BOOST VALUE

FIG.9

| HEAD No. | CYLINDER No. | FILTER COSTANT | | DETECTION LEVEL VOLTAGE | OTHERS |
|---|---|---|---|---|---|
| | | Fc (MHz) | Fb (dB) | | |
| 0 | 0 ~ 500 | 5 | 5 | V01 | |
| 0 | 501 ~ 1000 | 6 | 4 | V02 | |
| 0 | 1001 ~ 1500 | 7 | 5 | V03 | |
| 1 | 0 ~ 500 | 5 | 3 | V11 | |
| 1 | 501 ~ 1000 | 6 | 3 | V12 | |
| 1 | 1001 ~ 1500 | 7 | 5 | V13 | |
| ------ | ------ | ------ | ------ | ------ | |

FIG.12

| HEAD No. | ZONE No. | FILTER CONSTANT | | DETECTION LEVEL VOLTAGE | OTHERS |
|---|---|---|---|---|---|
| | | Fc (MHz) | Fb (dB) | | |
| 0 | 00 | 5 | 5 | $V_{01}$ | |
| 0 | 01 | 6 | 4 | $V_{02}$ | |
| 0 | 10 | 7 | 5 | $V_{03}$ | |
| 0 | 11 | 7 | 5 | $V_{04}$ | |
| 1 | 00 | 5 | 3 | $V_{11}$ | |
| 1 | 01 | 6 | 3 | $V_{12}$ | |
| 1 | 10 | 7 | 5 | $V_{13}$ | |
| 1 | 11 | 7 | 4 | $V_{14}$ | |
| ----- | ----- | ----- | ----- | ----- | |

FIG.14

| HALF VALUE WIDTH OF ISOLATED WAVEFORM | OPTIMUM FILTER CONSTANT | | OTHERS |
|---|---|---|---|
| $W_0$ | $Fc0$ | $Fb0$ | |
| $W_1$ | $Fc1$ | $Fb1$ | |
| $W_2$ | $Fc2$ | $Fb2$ | |
| ⋮ | ⋮ | | |
| $W_i$ | $Fci$ | $Fbi$ | |
| ⋮ | ⋮ | | |
| $W_n$ | $Fcn$ | $Fcn$ | |

Fc : CUT-OFF FREQUENCY

Fb : BOOST VALUE

FIG.15

| HEAD No. | FILTER CONSTANT | | OTHERS |
|---|---|---|---|
| | Fc(MHz) | Fb(dB) | |
| 0 | 5 | 5 | |
| 1 | 7 | 5 | |
| 2 | 6 | 4 | |
| 3 | 5 | 3 | |
| 4 | 6 | 3 | |
| ⋮ | ⋮ | ⋮ | |

MAGNETIC DISC APPARATUS

BACKGROUND OF THE INVENTION

The present invention relates to a magnetic disc apparatus or the like using an electric filter for waveform equalization of a read signal and, more particularly, to a magnetic disc apparatus for executing writing and reading operations by controlling so as to set the optimum parameter for every head.

In recent small disc apparatuses, the realization of a large capacity and a high density is further demanded in association with the realization of a small size and a high performance of a computer system.

For this purpose, it is necessary to further properly set a low pass filter, a waveform equalizing circuit, and a pulse detection level other than the conventional apparatus with respect to physical characteristics of a magnetic head and a magnetic disc medium, a recording position on the medium, and a recording frequency.

In the conventional magnetic disc apparatus, proper circuit characterisitics of a read pass filter and a waveform equalizing circuit and a proper value of a pulse detection level which is used to detect the peak of a read signal differ depending on a difference of a combination of the magnetic head and the magnetic disc medium or the like.

The circuit characteristics of the read pass filter and waveform equalizing circuit and the pulse detection level are switched in accordance with the cylinder position at which the magnetic head is located (the radius position of the magnetic head from the center of the medium).

As circuit characteristics and the peak detection level which are used in the above switching operations, hitherto, the values obtained by a statistic method are used in many cases.

When the set values to decide the characteristics of the read pass filter and waveform equalizing circuit and the pulse detection level which were obtained by using the statistic method are used, however, the result of judgment regarding whether a combination of a certain magnetic head and a certain magnetic disc medium can effectively read out the data by the set values which were switched in accordance with the cylinder position or not is given by only a statistical probability, so that the optimum values cannot be always set.

On the other hand, the set tolerances of the characteristics of the low pass filter and waveform equalizing circuit and of the pulse detection level are further narrow due to the realization of a high density. Furthermore, in case of increasing the number of magnetic disc media and the number of magnetic heads in order to increase the capacity of the magnetic disc, a probability such that all of the magnetic heads can effectively read out the data on the basis of the set values which were statistically obtained further decreases.

There are, consequently, problems such that not only the yield of the apparatus deteriorates but also there is a case where the set values are set the values which are as close as the limit values of the tolerances in dependence on the magnetic head, and the stability and reliability of the whole apparatus deteriorate.

SUMMARY OF THE INVENTION

According to a magnetic disc apparatus of the present invention, circuit parameters using the optimum set values which are optimum to a combination of peculiar magnetic head and magnetic disc can be set on a head unit basis, further, on a cylinder unit basis, so that the apparatus can be optimized and the yield of the apparatus can be improved and the reliability can be improved.

According to the present invention, there is provided a magnetic disc apparatus comprising: a plurality of magnetic recording media in which information of circuit parameters regarding the recording and reproduction of information has previously been recorded; a plurality of magnetic heads provided for the plurality of magnetic recording medium, respectively; a writing section for selecting either one of the plurality of magnetic heads and for writing the information onto the magnetic recording medium; a reading section for selecting either one of the plurality of magnetic heads and for reading out the information from the magnetic recording medium; and an electric filter which is provided in the reading section and executes a waveform equalization to a read signal from the magnetic head and whose filter characteristics can be variably set by a signal from an outside.

According to the present invention, there is provided a circuit parameter control apparatus regarding such a magnetic disc apparatus, wherein when the use of the apparatus is started, the information which has previously been recorded on the magnetic recording medium is read out and a set value table in which the optimum values of the circuit parameters including at least the electric filter have been stored every magnetic head is formed by a table forming section. After the set value table was formed, prior to executing the writing or reading operation, the set values in the set value table corresponding to the designated magnetic head are read out, thereby controlling the circuit parameters of the circuit section including the electric filter.

Information about the filter characteristics of the electric filter is recorded on each of a plurality of magnetic recording media. A set value table in which the optimum filter characteristics values of the electric filter have been stored every magnetic head is formed.

The information regarding the filter characteristics of the electric filter is divided every cylinder and recorded to each of the plurality of magnetic recording media and a set value table in which the optimum filter characteristics values of the electric filter which is used have been stored every magnetic head and every cylinder can be also formed.

Further, it is also possible to construct in a manner such that the information regarding the filter characteristics of the electric filter is divided into zones of every predetermined number of cylinders and a set value table in which the optimum filter characteristics values of the electric filter which is used have been divided and stored every magnetic head and every predetermined number of zones is formed.

In case of the above zone division, the circuit parameters of the electric filter which is used in the writing or reading operation of the designated cylinder are obtained by interpolating calculations of the zone set values stored in the set value table and the circuit parameters are controlled.

As set values regarding the electric filter which are recorded onto each of the plurality of magnetic recording media, a cut-off frequency $F_c$ and a boost value $F_b$ and, further, a circuit parameter to decide either one of them are recorded. The table forming section forms a set value table in which the cut-off frequency $F_c$ and boost value $F_b$ of the electric filter which is used every magnetic head and the circuit parameter to decide either one of them have been stored.

The apparatus has an ROM table in which the circuit parameters which are used when reading out the medium information obtained at the start of the use of the apparatus have fixedly been stored. After the circuit section was controlled by the circuit parameters stored in the ROM table, the information about the circuit parameters which have previously been recorded in the magnetic recording medium is read out.

In this case, the apparatus has the ROM table in which a plurality of kinds of circuit parameters which are used when information is read out have fixedly been stored. After the circuit section was controlled by the circuit parameters stored in the ROM table, the information regarding the circuit parameters which have previously been recorded in the magnetic recording medium can be also read out. When the information cannot properly be read out, on the other hand, the circuit section is controlled by other circuit parameters in the ROM table and the reading operation can be also again tried.

There is also a method whereby even in a state in which the circuit parameters are controlled to the values fixedly stored in the ROM table, in order to make it possible to certainly read out the information regarding the circuit parameters which have previously been recorded on the magnetic recording medium, a medium recording density of the circuit parameter is set to a low value. Specifically speaking, a transfer speed when information is written onto the medium is set to a low value.

Further, when the information about the circuit parameters is recorded onto the magnetic recording medium, it is desirable to record such information to the innermost rim at which a peripheral speed is low. This is because the cost performance of the apparatus is high by using the outer rim region of a high transfer speed as a user's region as possible. Such a method is, particularly, effective in case of a constant density recording, which will be explained hereinlater.

Further, in addition to the information regarding the filter characteristics of the electric filter, a pulse detection level to detect the peak value of a read signal, a write compensation time, and a write current are recorded onto each of a plurality of magnetic recording media. In this case, the table forming section forms a set value table in which in addition to the optimum filter characteristic values of the electric filter which is used, at least one of the pulse detection level, write compensation time, and write current have been stored for very magnetic head.

Further, the writing section executes a constant density recording such that information is written by variably changing a recording frequency in a manner such that a physical recording length per unit information in a range from the inner rim cylinder to the outer rim cylinder is set to a predetermined value. The circuit parameters suitable for the recording frequency of each cylinder to execute the constant density recording (CDR) are previously recorded onto the magnetic recording medium. In this case, the table forming section forms the set value table in which the circuit parameters suitable for the recording frequency have been stored every magnetic head and every cylinder. The circuit section is controlled to the circuit parameters of the set value table corresponding to the designated magnetic head and cylinder.

With respect to the constant density recording, the set value table in which the circuit parameters suitable for the recording frequency have been stored is formed every zone and the circuit section can be also controlled to the circuit parameters of the set value table corresponding to the zone included in the designated magnetic head and cylinder.

On the other hand, as a modification of the magnetic disc apparatus of the present invention, after an isolated waveform was recorded onto the magnetic recording medium, the isolated waveform is read out at the start of the use of the apparatus and the half value width of the read-out isolated waveform is measured. The circuit parameters which give the optimum characteristics of the electric filter corresponding to the measured half value width of the isolated waveform are read out from the ROM table. The set value table in which the read-out circuit parameters have been stored every magnetic head is formed. Prior to executing the writing or reading operations, the set values in the set value table corresponding to the designated magnetic head are read out, thereby controlling the characteristics of the electric filter.

In the writing of the isolated waveform here, a 1-7 run length code or a 2-7 run length code indicative of bit 1 is continuously written by using a write clock of a frequency that is sufficiently lower than a frequency of an ordinary write clock. When the isolated waveform is read out, after completion of the writing of the isolated waveform, the 1-7 run length code or 2-7 run length code is read out by the same read clock as the clock upon writing.

When the half value width of the isolated waveform is measured, the half value width is measured every cylinder of the magnetic recording medium. The table forming section forms the set value table in which the optimum filter characteristic values of the electric filter which is used have been stored for every magnetic head and every cylinder.

On the other hand, the recording region of the magnetic recording medium is divided into zones of every predetermined number of cylinders and the half value width of the isolated waveform is measured. The set value table in which the optimum filter characteristic values of the electric filter have been stored is formed every zone.

In case of the above zone division, the circuit parameters of the electric filter which is used in the writing or reading operation of the designated cylinder are obtained by the interpolating calculations of the zone set value stored in the set value table, thereby performing the control.

According to the magnetic disc apparatus of the present invention as mentioned above, after the power source of the apparatus was turned on and a spindle motor reached a stationary rotational speed, the special magnetic head is moved to the position at which the information regarding the magnetic recording medium, for example, about the electric filter for waveform equalization has been written. The above information is read out and the set value table is formed in a memory such as an RAM or the like. After that, when a read command is sent from a high-order apparatus, the magnetic head is selected and is sought to the target cylinder. At the same time, by controlling the constants of the electric filter to the set values which were read out from the set value table, thereby setting the optimum filter characteristics. The data reading operation can be executed.

The invention is not limited to the control of the electric filter but with respect to the circuit parameters such as pulse detection level, write compensation time, write current, and the like as well, the optimum characteristics can be also set by controlling them in substantially the same manner as mentioned above.

Further, even in the case where after the isolated waveform was written onto the magnetic recording medium by the magnetic head, the isolated waveform is read out and the half value width of the isolated waveform is measured and the set value in the ROM table corresponding to the measured value is read out and the set value table which gives the filter characteristics is formed every magnetic head and the control is executed, even when the magnetic head is switched, the reading operation due to the optimum filter characteristics can be always similarly executed.

The above and other objects, features, and advantages of the present invention will become apparent from the following detailed description and the appended claims with reference to the accompanying drawings.

BRIEF DESCRIPTION OF THE DRAWINGS

FIGS. 1a and 1b are a block diagram showing a construction of an apparatus according to the present invention;

FIG. 8 is an explanatory diagram of an ROM table which is used in the table forming process of FIG. 7;

FIG. 9 is an explanatory diagram of the set value table formed by the process in FIG. 7;

FIG. 12 is an explanatory diagram of a set value table which is formed in case of applying the present invention to the constant density recording of FIG. 11;

FIG. 14 is an explanatory diagram of an ROM table in which circuit parameters for half value widths which are used in the table forming process of FIG. 13 have been stored; and FIG. 15 is an explanatory diagram of the set value table formed by the process of FIG. 13.

DETAILED DESCRITION OF THE PREFERRED EMBODIMENT

1. Hardware Construction

Figure 2:
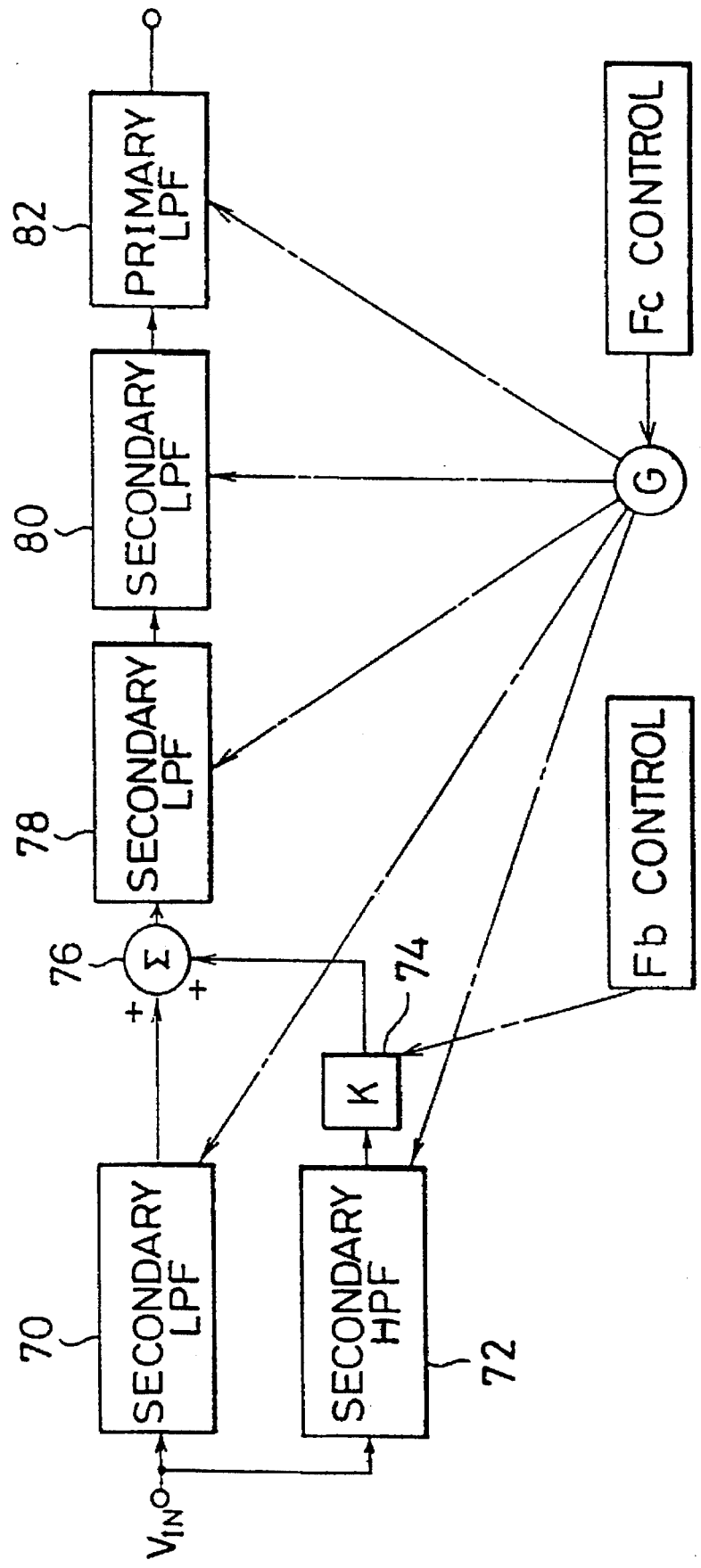
FIG. 2 is a block diagram of an electric filter.

In FIG. 1, reference numeral 15 denotes a disc enclosure having a plurality of magnetic discs 10 which are rotated at a predetermined rotational speed by a spindle motor 28 using a brushless DC motor. A magnetic head 12 is arranged for the recording surface of the magnetic disc 10. In the embodiment, seven magnetic heads are used. One of the seven magnetic heads 12 is a servo head which is used to read out servo information. The remaining six magnetic heads 12 are used to write or read out information. The magnetic head 12 is controlled in the radial direction of the magnetic disc 10 by a head actuator using a VCM 26.

A signal line from the magnetic head 12 is connected to the head IC circuit 30. The head IC circuit 30 comprises: a switching circuit to select and connect either one of a plurality of magnetic heads 1; a switching circuit to switch the reading operation and the writing operation of the head; and a write amplifier with respect to the writing side or a preamplifier with regard to the reading side.

An AGC circuit 32, an electric filter 18, and a pulse detecting circuit 34 are provided for a reading system subsequent to the head IC circuit 30. On the other hand, a write compensating circuit 44 is provided for a writing system. The AGC circuit 32 operates as a main amplifier to perform an automatic gain control (AGC) of a read signal obtained by the head IC circuit 30. The electric filter 18 performs a waveform equalization to the read signal derived by the AGC circuit 30. The electric filter 18 can freely control the cut-off frequency $F_c$ [MHz] and the boost value $F_b$ [dB] by a control signal from an outside. The pulse detecting circuit 34 detects the peak value of a read signal which has been subjected to the waveform equalization by the electric filter 18, thereby forming a pulse train.

A read/write control circuit 36 comprises a data discriminating section 37, an encoding/decoding section 38, a format control section 40, and a buffer memory 42. The read/write control circuit 36 is connected to an MPU 48 for driving through an internal bus 52 and is also connected to an MPU 46 for interface to execute a communicating process with a higher apparatus through the internal bus 52.

A ROM 54, a RAM 56, a servo information demodulating circuit 50, an actuator control circuit 58, and a spindle motor control circuit 60 are connected to the internal bus 52 of the MPU 48 for driving. A control program which is executed by the driving MPU 48 is stored in the ROM 54. The MPU 48 executes a write control and a read control for the magnetic discs 10 in the disc enclosure 15, a rotation control of the spindle motor 28, and a servo control for seeking control and fine control by the VCM 26 in accordance with the control program.

As for the demodulation of the servo information by the servo information demodulating circuit 50, the read signal from the servo head derived by the AGC circuit 32 is supplied to a peak holding circuit 65, by which a peak value is held. Further, an output signal of the peak holding circuit 65 is supplied to an A/D converter 64, thereby obtaining a position signal or the like.

For such a magnetic disc apparatus as mentioned above, according to a circuit parameter control apparatus of the present invention, circuit parameter set values to optimize the circuit characteristics of the writing system and reading system with respect to the corresponding combination of the magnetic disc 10 and the magnetic head 12 have previously been written at the cylinder position of, for instance, the innermost position of the lowest peripheral speed of each of the magnetic discs 10 provided in the disc enclosure 15. As circuit parameter set values which are previously written to the magnetic disc 10, for example, there are a set value to decide filter characteristics of the electric filter 18 and a pulse detection level of the pulse detecting circuit 34. A write compensation time for the write compensating circuit 44 and a value of a write current or the like of the write amplifier provided for the head IC circuit 30 can be also previously recorded as set values.

The MPU 48 for driving realizes the functions as a table forming section 20 and a control section 24 by the program control. A set value table 22 is stored in the RAM 56 and an ROM table 26 is further stored in the ROM 54.

In the first embodiment of the invention, when the power source of the magnetic disc apparatus is turned on and the use of the apparatus is started, the table forming section 20 which is realized by the program control of the MPU 48 reads out information regarding the setting of the circuit parameters which have previously been recorded on the magnetic disc 10. The set value table 22 in which, for instance, the optimum values of the circuit parameters have been stored for every magnetic head is formed in the RAM 56 by the table forming section 20. As a set value table 22 which is formed in the RAM 56, in addition to the set value table in which the optimum values are stored every magnetic head, it is also possible to divide the cylinder of the magnetic disc 10 into a plurality of zones and to form the set value table 22 in which the optimum values are set every zone. Although it is possible to form the table every cylinder, since an amount of information increases, it is desirable that the table is formed every zone, the cylinder position in the zone is discriminated, the interpolating calculation is executed on the basis of the zone set value, and the set value is obtained every cylinder.

When the control section 24 which is realized by the program control of the MPU 48 for driving receives a read command or a write command from a higher apparatus through the MPU 46 for interface control, the control section 24 refers to the set value table 22 in the RAM 56 on the basis of the head number and cylinder number which are designated by the command, reads out the set values corresponding to the head number and cylinder number, controls the corresponding circuit section to the read-out set values, and thereafter executes the writing or reading operation. When the circuit parameters are controlled to the set values in the set value table 22, the actuator control circuit 58 is simultaneously made operative, thereby executing a seeking control such that the magnetic head 12 is moved to the designated cylinder position of the magnetic disc 10. When the magnetic head 12 reaches the designated cylinder position and the control mode is switched to the tracking control (fine control), each of the circuit parameters has already been controlled to the value read out from the set value table 22, thereby enabling the writing or reading operation to be immediately executed.

A D/A converter 62 is provided for the electric filter 18 in order to control the circuit parameters on the basis of the set value table 22. The MPU 48 for driving instructs the set value data which has been read out from the set value table 22 and gives the cut-off frequency $F_c$ and boost value $F_b$ to D/A converters 62 and 63. The filter characteristics of the electric filter 18 are controlled by analog control currents from the D/A converters 62 and 63. A D/A converter 66 to set the pulse detection level which has been read out as a set value in the set value table 22 into the pulse detecting circuit 34 is provided for the pulse detecting circuit 34. Further, an A/D converter 68 is provided at the input stage of the AGC circuit 32. However, the A/D converter 68 is not used in the first invention but is used for sampling the isolated waveform read out from the magnetic disc 10 and giving to the MPU 48 for driving at the start of the use of the apparatus in the second invention of the present invention, which will be obviously understood by an explanation hereinafter.

2. Electric Filter

In FIG. 1, a circuit parameter control apparatus of the present invention intends to control the filter characteristics of the electric filter 18 to mainly perform the waveform equalization to the read signal to the optimum values. Therefore, the electric filter 18 will now be described in detail hereinbelow.

FIG. 2 is a constructional diagram of an embodiment of the electric filter of FIG. 1. In FIG. 2, hitherto, the electric filter 18 is used in place of a cosine equalizing circuit used for waveform equalization. The cut-off frequency $F_c$ and boost value $F_b$ of the electric filter 18 can be arbitrarily set by a control signal from the outside and the filter characteristics can be changed. The electric filter comprises a secondary low pass filter 70, a secondary high pass filter 72, an attenuator 74, an adder 76, secondary low pass filters 78 and 80, and a primary low pass filter 82. That is, one HPF of the second order and four LPF of total seventh order are combined.

A transfer function of each filter is as follows.

Secondary LPF 76=$a_0/(S^2+a_1S+a_0)$

Secondary HPF 78=$S^2/(S^2+a_1S+a_0)$

Secondary LPF 80=$b_0/(S^2+b_1S+a_0)$

Secondary LPF 82=$c_0/(S^2+c_1S+a_0)$

Primary LPF 84=$d_0/(S+d_0)$ where, $S=j\Omega=j\omega/\omega_c$

Therefore, a transfer function A of the electric filter 18 is obtained as follows.

$$\begin{aligned} A &= V_{OUT}/V_{IN} \\ &= \{a_0 b_0 c_0 d_0(1-GS)\}/\{(S^2+a_1S+\\ &\quad a_0)(S^2+b_1S+a_0)\\ &\quad (S^2+c_1S+a_0)(S+d_0)\} \end{aligned}$$

where, $a_0$, $a_1$: Constants of the filters 70 and 72

$b_0$, $b_1$: Constants of the filter 78

$c_0$, $c_1$: Constants of the filter 80

$d_0$: Constant of the filter 82

In a manner similar to the conventional cosine equalizing circuit used for waveform equalization, by providing the frequency characteristics such that a high frequency band is emphasized, a pulse slimming of the read-out waveform can be performed and a peak shift due to a waveform interference can be suppressed.

As compared with the conventional cosine equalizing circuit, the electric filter 18 is more advantageous with respect to the following points.

(1) A delay line is unnecessary.

(2) The signal processes up to the read data can be executed by a differential circuit.

(3) In case of performing the optimum equalization by the cosine equalizing circuit, a plurality of delay lines are needed. However, the optimum equalization can be executed by one electric filter.

Figure 5:
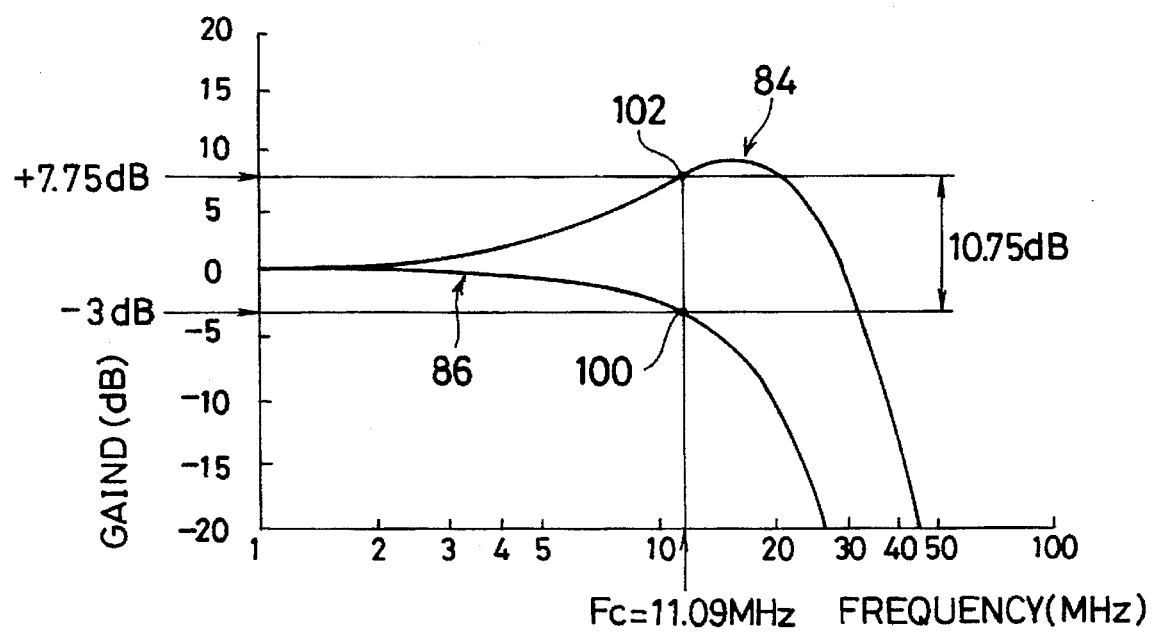
FIG. 5 is a characteristic diagram of a frequency of the electric filter.

FIG. 5 is an explanatory diagram showing an example of specific filter characteristics of the electric filter shown in FIG. 2. In FIG. 5, reference numeral 84 denotes characteristics of the electric filter in the case where the cut-off frequency $F_c$=11.09 MHz and the boost value $F_b$=10.75 dB. Reference numeral 86 denotes characteristics of the electric filter in the case where the boost value $F_b$=0 dB. The boost value $F_b$ to decide the high frequency band emphasizing characteristics of the electric filter is defined as an increased gain of a point 102 on the characteristics 84 from a point 100 of the cut-off frequency $F_c$ corresponding to the decrease amount of the gain of 3 dB on the characteristics 86 in the case where the boost value $F_b$=0 dB.

Figure 3:
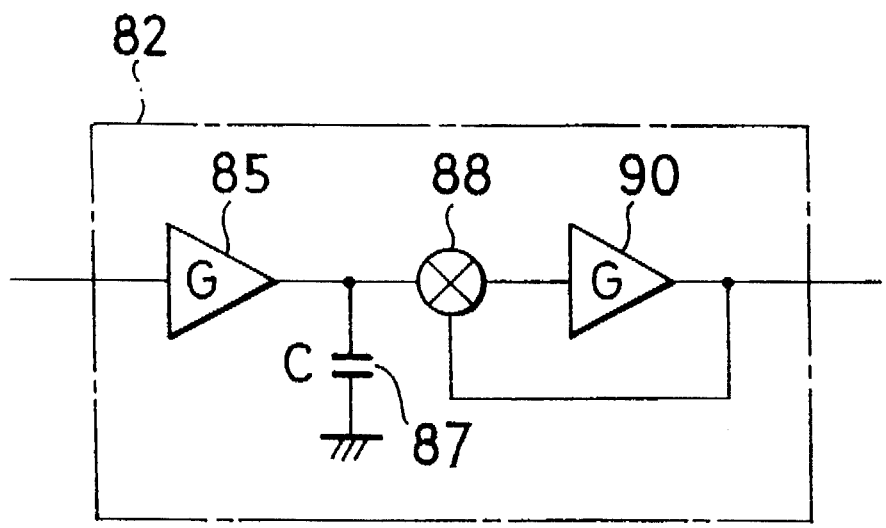
FIG. 3 is a circuit diagram of a primary low pass filter in FIG. 2.
Figure 4:
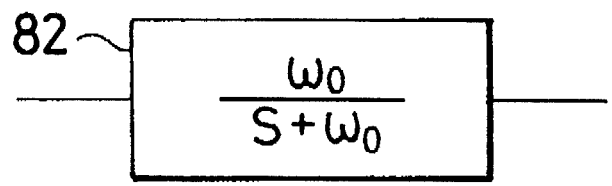
FIG. 4 is an explanatory diagram of a transfer function of the primary low pass filter in FIG. 2.

According to the present invention, as shown in FIG. 2, the cut-off frequency $F_c$ is controlled by adjusting gains G of the secondary low pass filters 70, 78, and 80, the secondary high pass filter 72, and the primary low pass filter 82. For instance, in case of the primary low pass filter 82 at the final stage, as shown in FIG. 3, the primary LPF 82 is constructed by an amplifier 85, a capacitor 87, an addition point 88, and an amplifier 90. The transfer function of the primary LPF 82 is obtained as follows as shown in FIG. 4.

$$\omega_0/(S+\omega_0)$$

Now, assuming that a capacity of the capacitor 87 is set to C, $\omega_0$ is obtained as follows.

$$\omega_0 = G/C$$

Since $\omega_0 = 2\pi f_c$, the cut-off frequency $f_c$ is obtained by the following equation.

$$f_c = G/2\pi C$$

Therefore, by changing the gains G of the amplifiers 85 and 90, the cut-off frequency $f_c$ of the primary LPF 82 can be adjusted. The same shall also apply to the other filters 70, 72, 78, and 80. By adjusting the gain G, the whole cut-off frequency $F_c$ of the electric filter 18 can be controlled. On the other hand, the boost value $F_b$ can be controlled by changing an attenuation constant K of the attenuator 74.

3. Processing Operation

Figure 6:
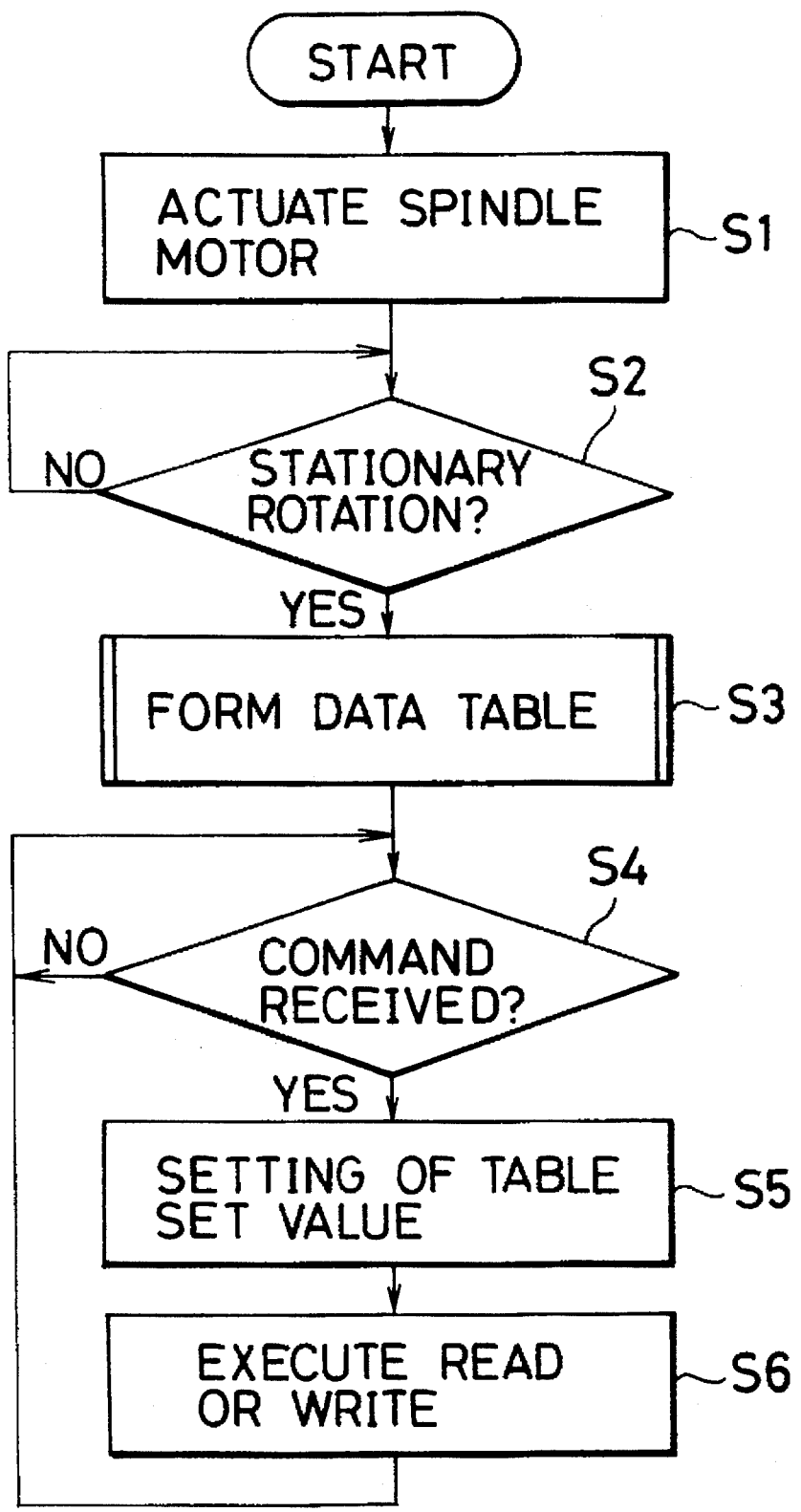
FIG. 6 is a generic flowchart showing the processing operation of a magnetic disc apparatus according to the present invention.

FIG. 6 is a generic flowchart showing the outline of a control process in the magnetic disc apparatus of FIG. 1. In FIG. 6, when the power source of the magnetic disc apparatus is turned on, the spindle motor control circuit 60 first activates the spindle motor 28 in step S1 under control by the MPU 48 for driving. In the next step S2, a check is made to see if a rotational speed of the spindle motor 28 has reached a predetermined stationary rotational speed or not. If YES, step S3 follows and a process to form the set value table 22 is started. The process to form such a data table is shown as a subroutine in FIG. 7.

When the set value table is formed in step S3, the processing routine advances to step S4 and a check is made to see if a read command or a write command has been received from the higher apparatus or not. When the command is received, the corresponding set value is read out with reference to the set value table 22 in step S5 on the basis of the head number and cylinder number designated by the command. For instance, in case of the read command, the read set value is set into the electric filter 18 and pulse detecting circuit. The optimum filter characteristics and pulse detection level corresponding to the designated magnetic head and cylinder position are set.

Simultaneously with the set control of the circuit parameters, the actuator control circuit 58 allows the magnetic head 12 to seek to a target track of the magnetic disc 10. When the magnetic head reaches the target track, the circuit parameters of the electric filter 18 and the pulse detecting circuit 34 have already been set to the optimum values. In the next step S6, the reading or writing operation is executed. The processing routine is returned to step S4 to judge the reception of the command. A series of processes mentioned above are repeated after that.

4. Forming Process of the Set Value Table

Figure 7:
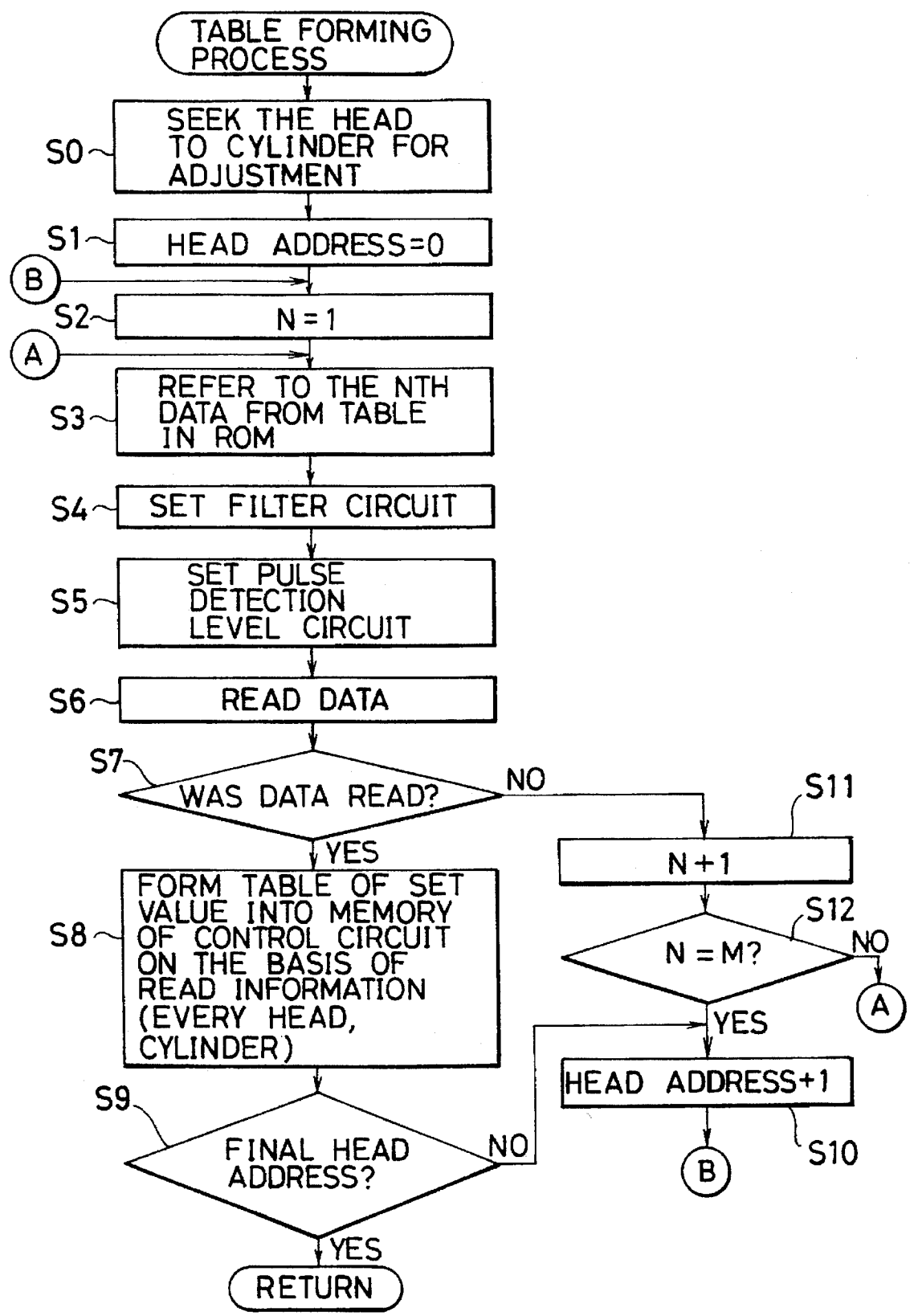
FIG. 7 is a flowchart showing a forming process of a set value table which is used in the invention.

FIG. 7 is a flowchart showing in detail the forming process of the data table shown in step S3 in FIG. 6. In the forming process of the set value table 22 in FIG. 7, the ROM table 26 is prepared in the ROM 54 of the MPU 48 shown in FIG. 1. The set values to set the values of the circuit parameters when the information regarding the circuit parameters previously stored in the magnetic disc 10 is read out have fixedly been stored in the ROM table 26.

FIG. 8 is an explanatory diagram showing an example of the ROM table 26 fixedly stored in the ROM 54 which is used in the forming process of the set value table 22 in FIG. 7. In the ROM table 26 of FIG. 8, cut-off frequencies $F_{co}$ to $F_{cM}$ and boost values $F_{bo}$ to $F_{bM}$ are stored as filter constants of the electric filter 18 every data numbers 0 to M. Similarly, pulse detection level voltages $V_0$ to $V_M$ which are used in the pulse detecting circuit 34 are stored in the ROM table 26. The set values stored in the ROM table 26 are the set values obtained by the conventional statistical method. There is a fear such that in case of one kind of set value, the set values cannot be read out. Therefore, a plurality of kinds of set values of the data numbers 0 to M which have statistically been derived are stored in the ROM table. The set values are sequentially read out in accordance with the order of the data numbers and the circuit parameters are controlled. When the set values cannot be read out even if the circuit parameters are controlled to the set values read out from the ROM table 26, the circuit parameters are controlled to the set values of the next data number in the ROM table 26 and the reading operation is retried.

As information regarding the circuit parameters, the same information is written on each disc surface in the cylinder for adjustment. Even when the user fails to read out the information about the circuit parameters by the designation of the head number =0, by sequentially switching to the next head number and retrying the reading operation, the set values can certainly be read out. Therefore, even in case of the set values obtained by the statistical method in the ROM table 26, by using several kinds of set values, the information regarding the circuit parameters which have previously been stored in the magnetic disc 10 can be certainly read out and the set value table 22 can be formed even in a state such that the set values of the optimum circuit parameters are obscure.

Even in a state such that the circuit parameters are controlled to the values which have fixedly been stored in the ROM table 26, in order to make it possible to certainly read out the information regarding the circuit parameters previously recorded in the magnetic recording medium 10, it is desirable to set a medium recording density of the circuit parameters to a low value. Specifically speaking, the transfer speed in the writing mode of the medium is set to a low value.

When the information regarding the circuit parameters is recorded to the magnetic recording medium 10, it is desirable to record the information to the innermost rim of a low peripheral speed. This is because the cost performance of an apparatus is raised by using the outer rim region of a high transfer speed as a user's region as possible. Such a method is particularly effective in the constant density recording, which will be explained hereinlater.

In the forming process of the set value table 22 in FIG. 7, the magnetic head 10 is first sought to the cylinder for adjustment in step S0. In the next step S1, the head address is set into "0" and the first magnetic head 1 is selected. In step S2, the data No. N=0 in the ROM table 26 shown in FIG. 7 is subsequently set. In step S3, the set values are read out with reference to the data of N=0 in the ROM table 26.

In step S4, the set values are set into the electric filter 18 so as to be the cut-off frequency $F_{co}$ and boost value $F_{bo}$ which were read out from N=0 in the ROM table 26, thereby controlling the filter characteristics. In step S5, the pulse detection level is set into the pulse detecting circuit 34 with reference to the data of N=0 in the ROM table 26, thereby controlling the pulse detection level. In step S6, the information regarding the circuit parameters written to the adjusting cylinder position of the innermost rim is read out by the magnetic head in the head address 0. In step S7, a check is made to see if the information about the circuit parameters has been read out or not. If YES, step S8 follows and the information regarding the read-out circuit parameters is stored into the set value table 22 prepared in the RAM 56. In step S9, a check is made to see if the head address indicates the final head or not. If NO, step S10 follows and the head address is increased by +1. After that, the processing routine is returned to step S2 and processes similar to those mentioned above are repeated with respect to the head address "1".

In step S7, when the information about the circuit parameters cannot be correctly read out, step S11 follows and the data number N in the ROM table 26 shown in FIG. 8 is increased by +1 (N=1). In step S12, a check is made to see if the data number is equal to the final data number M or not. After that, the processing routine is returned to step S3 and the filter constants and pulse detection level are set and controlled with reference to the ROM table 26 of the next data number N=2. After that, the data number N is increased one by one until the information regarding the circuit parameters are read out in step S7. By using the different filter constants and pulse detection level, the reading operation of the information about the circuit parameters is retried. If the data cannot be read out even at the final data number M, the processing routine advances to step S10 and the head address is increased by +1 and the processing routine is returned to step S2. In a state such that the magnetic head is switched to the next head, the retry of the reading operation using the data from the data number N=1 in the ROM table 26 is started.

When the processing routine about all of the head addresses is finished in step S9 by repeating the above processes, the processing routine is returned to the main routine of FIG. 5.

FIG. 9 is an explanatory diagram showing a specific example of the set value table 22 formed by the process in FIG. 7. In the set value table 22 in FIG. 9, there is shown an example in the case where head numbers have previously been added to the magnetic disc and a region from the inner rim cylinder to the outer rim cylinder is divided into three zones and the set values of the circuit parameters have preliminarily stored. Therefore, in correspondence to the head umbers of the set value table 22 formed, the region is divided into three zones of the cylinder numbers 0 to 500, 501 to 1000, and 1001 to 1500. The cut-off frequency $F_c$ [MHz], boost value $F_b$ [dB], and detection level voltage are stored as filter constants. The values of the cut-off frequency $F_c$ and boost value $F_b$ are not actually stored as filter constants which are stored in the set value table 22, but practically speaking, the attenuation constant K of the attenuator 74 for the electric filter shown in FIG. 2 which gives the values of the cut-off frequency and boost value and the voltage value and the like to decide the frequency characteristics of each filter are stored as filter constants.

5. Application to the Constant Density Recording

Figure 10:
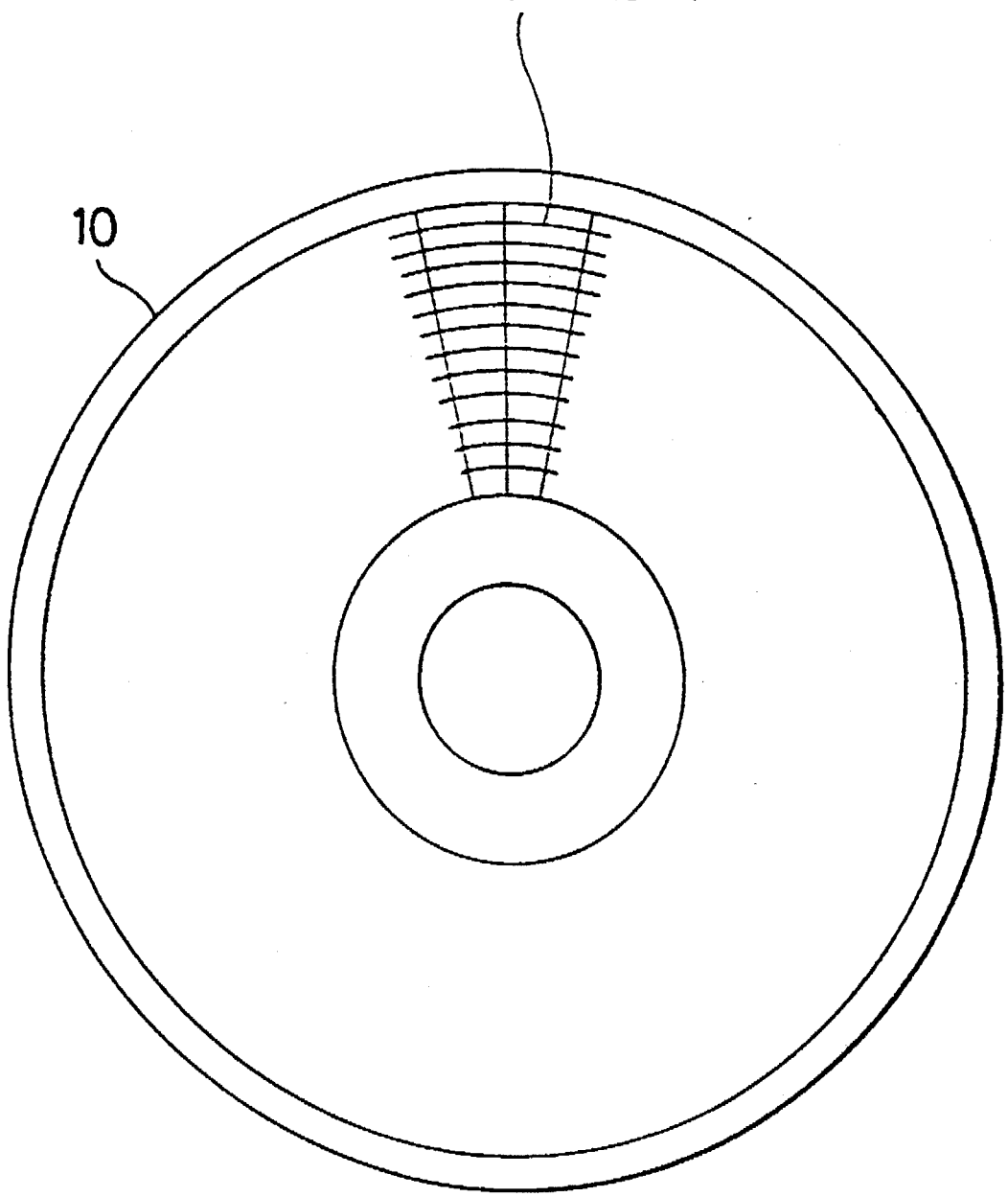
FIG. 10 is an explanatory diagram showing a recording length of data bit 1 in case of setting a recording frequency to a predetermined value.

FIG. 10 shows a recording state to the magnetic disc 10 in the magnetic disc apparatus of FIG. 1. The recording frequency is always set to a predetermined value irrespective of the cylinder position. Therefore, since the recording period per one bit of data is always set to a predetermined value, a physical recording length of one bit of data is short in case of the cylinder on the inner rim side of a low peripheral speed. On the contrary, the physical recording length of one bit of data is long in case of the cylinder on the outer rim side of a high peripheral speed.

Figure 11:
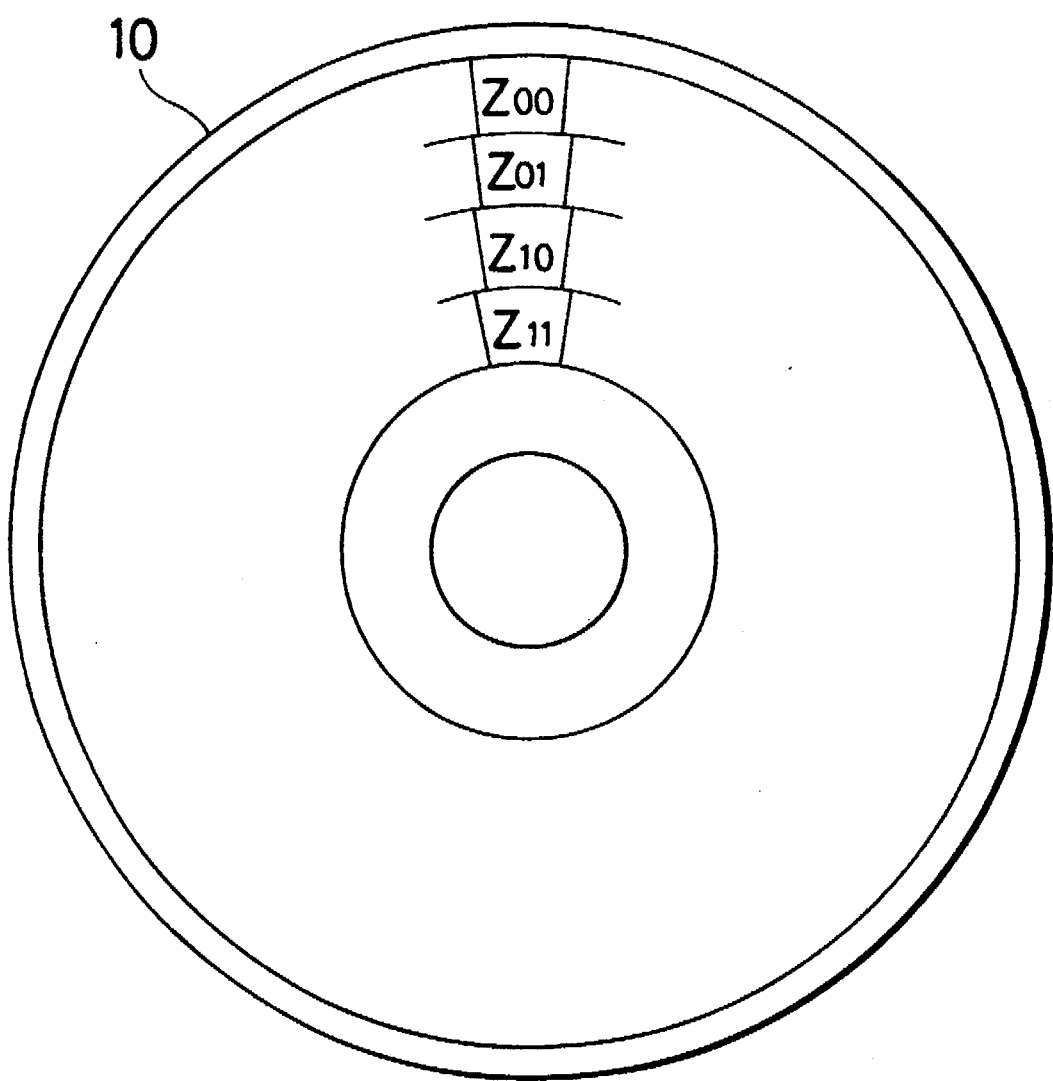
FIG. 11 is an explanatory diagram showing a constant density recording such that the recording frequency is changed in accordance with the cylinder position.

In the recording apparatus for the magnetic disc 10 of a constant recording frequency, as the cylinder position approaches the outer rim cylinder, the recording density decreases, thereby obstructing the realization of a high density. As shown in FIG. 11, accordingly, there is a constant density recording method whereby the whole cylinder is divided into, for example, four zones $Z_{00}$, $Z_{01}$, $Z_{10}$, and $Z_{11}$ and the writing frequency is changed every zone in a manner such that the physical recording length of one bit of data is equalized in any zone.

According to such a constant density recording method, a capacity of data which can be recorded in the outside zone of the magnetic disc 10 is larger than that in the inside zone and a recording capacity can be increased by about 1.4 times as compared with that by the apparatus which records information at a constant frequency as shown in FIG. 10.

The circuit parameter control apparatus of the present invention is optimum to the control of the circuit parameters in the writing and reading operations in the magnetic disc apparatus using the constant density recording method as shown in FIG. 11. That is, since the recording frequencies differ every zones $Z_{00}$ to $Z_{11}$ of the magnetic disc 10, the filter characteristics of the electric filter 18 in the reading operation also must be controlled to the characteristics adapted to each of the recording frequencies. Therefore, the optimum filter constants of the electric filter which have been predetermined every zones $Z_{00}$ to $Z_{11}$ are written into, for instance, the innermost rim cylinder of the magnetic disc 10. Due to this, a set value table 22 as shown in, for example, FIG. 12 can be formed by the process shown in the flowchart of FIG. 7 when the magnetic disc apparatus is used.

When the read command is received from the higher apparatus, consequently, the filter constants of the set value table 22 corresponding to the zone number which is determined by the designated head number and cylinder number are read out and the filter characteristics of the electric filter 18 are controlled. Due to this, the optimum filter characteristics adapted to the recording frequency of each zone are set and the reading operation can be certainly executed. The filter constants can be also obviously set in consideration of a variation due to the combination of the magnetic disc 10 and the magnetic head 12 in addition to the difference of the recording frequency, thereby enabling the optimum reading operation to be performed. The above point is also similarly applied to the writing operation. The recording information such as write compensation time, write current, and the like are read out in correspondence to the head number and zone number, the set value table 22 is formed, and when the write command is received, it is possible to perform the writing operation in which the corresponding circuit parameters have been controlled to the optimum values with reference to the set value table 22.

Figure 13:
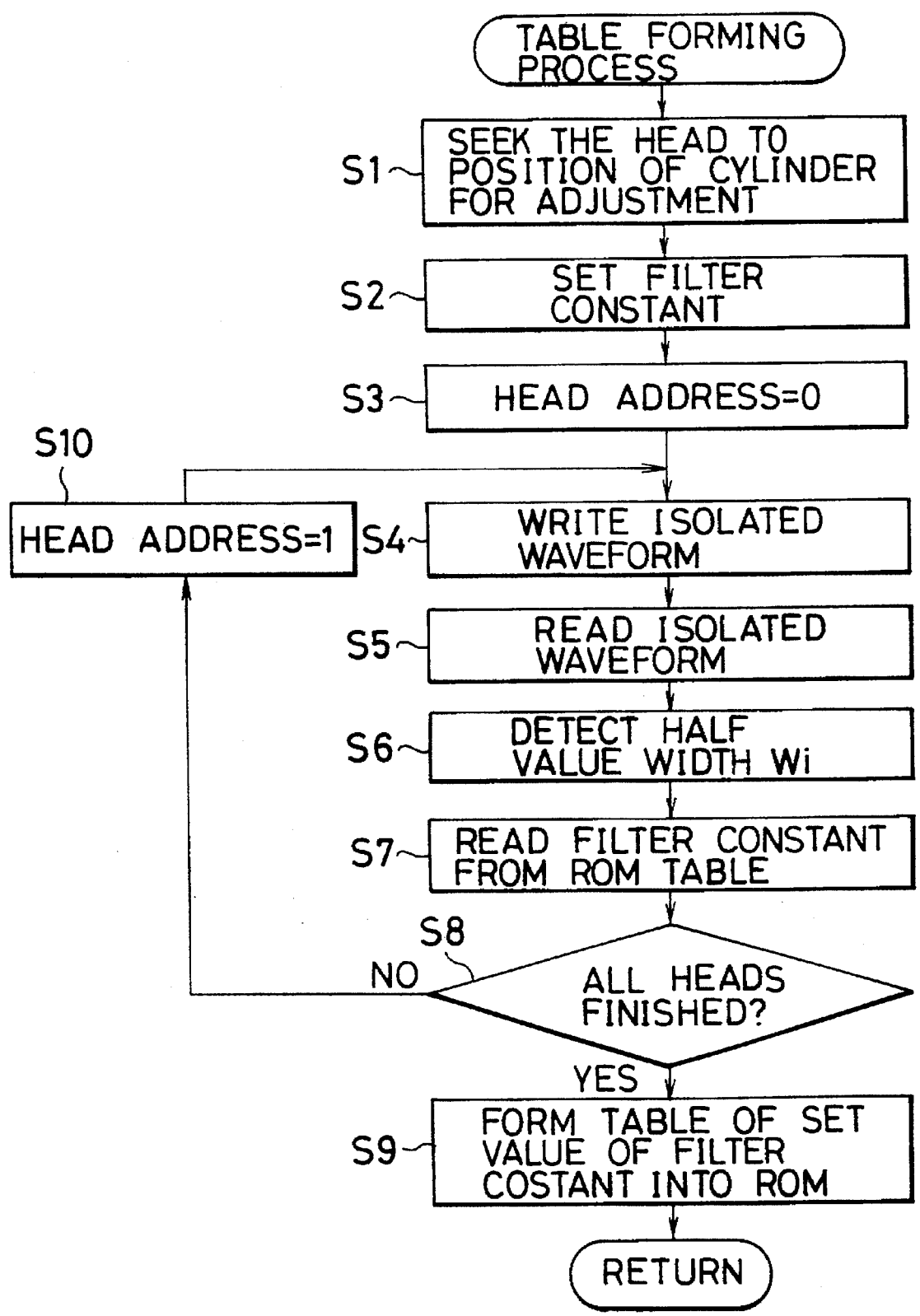
FIG. 13 is a flowchart showing a forming process of a set value table according to a modification of the present invention to form a set value on the basis of the half value width of an isolated waveform.

6. Forming Process of a Set Value Table From the Half Value Width of the Isolated Waveform FIG. 13 is a flowchart showing a table forming process in a modified embodiment of the present invention. The modification of the invention is characterized in that when the magnetic disc apparatus is used, an isolated waveform is actually written to the magnetic disc, the isolated waveform is read out, the half value width is measured, the optimum filter constants of the electric filter stored previously in the ROM table are read out in correspondence to the measured half value width, and the set value table 22 is formed.

A construction of a magnetic disc apparatus to realize the above modification can be realized by providing the A/D converter 68 to measure the isolated waveform in FIG. 1 to the input stage of the AGC circuit 32. The other construction is substantially the same as that in the first embodiment. To realize the modification, as shown in FIG. 14, a cut-off frequency $F_{ci}$ and a boost value $F_{bi}$ have fixedly been stored in the ROM table 26 of the ROM 54 as optimum filter constants of the electric filter 18 corresponding to a half value width $W_i$ of the isolated waveform.

A whole control for control processes of the magnetic disc apparatus according to the modification is substantially the same as that in the first embodiment shown in FIG. 6. In the above whole control, the forming process of the set value table 22 in step S3 in FIG. 6 is as shown in a subroutine of FIG. 13. In the forming process of a set value table according to the modification shown in FIG. 12, in step S1, the magnetic head 12 is first sought to the adjusting cylinder position. Filter constants which have fixedly been predetermined are set into the electric filter 18 in step S2. In step S3, the head address is set to first "0". In step S4, an isolated waveform is written to the adjusting cylinder position of the corresponding magnetic disc by using the magnetic head of the head address "0". When the isolated waveform is written, in the case where the ordinary write clock frequency is equal to, for example, 36 MHz, a write clock frequency such as 0.5 MHz which is sufficiently lower than the ordinary write clock frequency is used and bit 1 of a 1-7 run length code or a 2-7 run length code is continuously written.

In the next step S5, the written isolated waveform is read out by using the magnetic head 10 of the same head address "0". The half value width $W_i$ is detected in step S6. In this instance, the isolated waveform indicative of bit 1 of the read signal generated from a preamplifier of the head IC circuit 30 is sampled by an A/D converter provided at the front stage of the AGC circuit 32 shown in FIG. 1 and the sampled data is given to the MPU 48 for driving, thereby detecting the half value width $W_i$ by measuring means which is realized by the program control of the MPU 48. In step S7, the optimum filter constants are read out and latched with reference to the ROM table 26 shown in FIG. 14 on the basis of the value of the half value width $W_i$ detected. In step S8, a check is made to see if the above processes have been finished with respect to all of the heads or not. If NO, the head address is increased by +1 in step S10. The processes in steps S4 to S7 are similarly repeated. When it is decided in step S8 that the processes for all of the heads are completed, step S9 follows and the optimum filter constants obtained on the basis of the detected half value width are stored into the set value table 22 in the ROM 56 and the set value table 22 is formed. The processing routine is returned to the main routine of FIG. 5.

The process to store the information regarding the circuit parameters to the magnetic disc 10 side as in the table forming process in the modification of FIG. 13 is not executed. When the apparatus is actually used, by writing and reading out the isolated waveform, the half value width is obtained, the optimum filter constants are formed from the half value width, and the set value table is formed. Due to this, the circuit parameters are controlled to the optimum values which are further adapted to the actual situation of the apparatus and higher reliability and stability can be obtained.

FIG. 15 shows a specific example of the set value table 22 which is used in the modification and is obtained by the table forming process of FIG. 13. In this example, the cut-off frequency $F_c$ and boost value $F_b$ are stored as filter constants obtained in correspondence to the half value width measured every head number.

As a set value table 22 which is formed on the basis of the measurement of the half value width, in addition to the head number, for instance, as shown in FIG. 8, the region is divided into the zones for every predetermined cylinders, the writing and reading operations of the isolated waveform are executed every zone, the filter constants corresponding to the half value width are obtained, and the filter constants can be also set every head number and zone number. As mentioned above, in case of using the set value table 22 in which the region is divided into the zones and the filter constnats are set every zone, in order to make it possible to set and control the further optimized circuit parameters, the filter constants of the cylinder number designated by the command are obtained by linear interpolating calculations using the zone set values stored in the table and can be also set to the optimum values.

On the other hand, as for the setting control of the circuit parameters by the control means 24 provided for the MPU 48 by using the set value table 22 for the read command or write command, it is necessary to complete the setting control of the circuit parameters until the completion of the seeking of the magnetic head 12 to the target cylinder. Therefore, it is desirable to use a DSP which can execute processes at a high speed for the setting control of the circuit parameters and to enable the circuit parameters to be set to the optimum values simultaneously with the completion of the seeking operation.

According to the present invention as mentioned above, the optimum circuit parameters can be set in correspondence to a variation of each apparatus and changes in signals of the writing system and reading system due to the magnetic head, the magnetic disc, and the cylinder position. Even in the high density recording, the yield of the apparatus can be improved, and the reliability and stability of the apparatus in a using state can be remarkably improved.

Even when the specifications of the magnetic disc apparatus are changed, there is no need to exchange or switch the parts. By merely rewriting the information regarding the circuit parameters provided for the magnetic disc or the ROM of the apparatus, the optimum circuit parameters can be easily set.

The present invention is not limited to the foregoing embodiments but many modifications and variations are possible within the spirit and scope of the appended claims of the invention. The invention is not limited by the numerical values shown in the above embodiments.

What is claimed is:

1. A magnetic disc apparatus comprising:

a plurality of magnetic recording media;

a plurality of magnetic heads respectively provided for each of said plurality of magnetic recording media;

writing means for selecting any one of said plurality of magnetic heads and for writing information to said magnetic recording medium;

reading means for selecting any one of said plurality of magnetic heads and for reading out the information from the magnetic recording medium;

an electric filter having filter characteristics including a cut-off frequency Fc and a boost value Fb which determine transfer characteristics of said filter, wherein said electric filter is provided for said reading means and executes a frequency domain waveform equalization to a read signal from said magnetic head and said cut-off frequency Fc and said boost value Fb can be variably set by a signal from outside;

measuring means for writing an isolated waveform onto the magnetic recording medium using said writing means at the start of use of the apparatus and, thereafter, for reading out said isolated waveform using said reading means and measuring a half value width of said read-out isolated waveform;

a ROM table in which circuit parameters which give the optimum characteristics of the electric filter corresponding to the half value width of the isolated waveform have fixedly been stored;

table forming means for reading out the optimum value of the circuit parameters corresponding to the half value width measured by said measuring means from said ROM table and for forming a set value table in which set values have been stored for every magnetic head; and control means for reading out the set values from the set value table corresponding to the designated magnetic head prior to the writing operation by said writing means or the reading operation by said reading means and for controlling the characteristics of the electric filter.

2. An apparatus according to claim 1, wherein said measuring means continuously writes a 1-7 run length code indicative of bit 1 by using a write clock of a frequency that is sufficiently lower than a frequency of an ordinary write clock and reads out said code by a read clock of the same frequency as that upon writing after said code was continuously written, thereby writing and reading out the isolated waveform.

3. An apparatus according to claim 1, wherein said measuring means continuously writes a 2-7 run length code indicative of bit 1 by using a write clock of a frequency that is sufficiently lower than a frequency of an ordinary write clock and reads out said code by a read clock of the same frequency as that upon writing after said code was written, thereby writing and reading out the isolated waveform.

4. An apparatus according to claim 1, wherein said measuring means measures a half value width of the isolated waveform every cylinder of said magnetic recording medium, and said table forming means forms the set value table in which the optimum filter characteristics values of electric filter which is used have been divided and stored for every magnetic head and every cylinder.

5. An apparatus according to claim 1, wherein said measuring means divides the magnetic recording medium into zones of every predetermined number of cylinders and measures a half value width of the isolated waveform every zone, and said table forming means forms set value table in which the optimum filter characteristics values of the electric filter which is used have been divided and stored for every magnetic head and every zone.

6. An apparatus according to claim 1, wherein said control means obtains the circuit parameters of the electric filter which is used in the writing or reading operation of a designated cylinder by interpolating calculations of the zone set values stored in said set value table and controls said circuit parameters.

7. A magnetic disc apparatus comprising:

a plurality of magnetic recording media;

a plurality of magnetic heads respectively provided for each of said plurality of magnetic recording media;

writing means for selecting any one of said plurality of magnetic heads and for writing information to said magnetic recording medium;

reading means for selecting any one of said plurality of magnetic heads and for reading out the information from said magnetic recording medium;

an electric filter having a cut-off frequency Fc of approximately 5 MHz or higher and a boost value Fb which determine transfer characteristics of said filter, wherein said electric filter is provided for said reading means executes a frequency domain waveform equalization to a read signal from said magnetic head, and said cut-off frequency Fb and said boost value Fb can be variably set by a signal from outside;

storing means in which optimum values of circuit parameters including at least said electric filter have been stored for every said magnetic head; and control means for reading out the optimum values of the circuit parameters corresponding to the designated magnetic head from said storing means prior to the writing operation by said writing means or the reading means by said reading means and for controlling the circuit parameters of a circuit section including said electric filter, wherein said electric filter comprises:

a first secondary low pass filter and a secondary high pass filter receiving a signal from said reading means;

an attenuator connected to an output of said high pass filter and attenuating the same under control of said boost value;

an adder connected to outputs of said attenuator and first secondary low pass filter;

second and third secondary low pass filters connected in series to an output of said adder; and a primary low pass filter connected to an output of said third secondary low pass filter, each of said low pass filters and said high pass filter operating under control of said cut-off frequency.

8. A magnetic disc apparatus comprising:

a plurality of magnetic recording media on which information of circuit parameters regarding the recording and reproduction of information has previously been recorded;

a plurality of magnetic heads respectively provided for each of said magnetic recording media;

writing means for selecting any one of said plurality of magnetic heads and for writing information onto said magnetic recording medium;

reading means for selecting any one of the plurality of magnetic heads and for reading out the information from the magnetic recording medium;

an electric filter which is provided for said reading means having a cut-off frequency Fc of approximately 5 MHz or higher and a boost value Fb which determine transfer characteristics of said filter, wherein said electric filter executes a frequency domain waveform equalization to a read signal from the magnetic head, and said cut-off frequency and said boost value can be variably set by a signal from outside, table forming means for reading out the information previously recorded on the magnetic recording medium from said reading means at the start of the use of the apparatus and for forming a set value table in which optimum values of the circuit parameters including at least said electric filter have been stored for every said magnetic head; and control means for reading out the set values in said set value table corresponding to the selected head prior to the writing operation by said writing means or the reading operation by said reading means and for controlling the circuit parameters of a circuit section including the electric filter, wherein said electric filter comprises:

a first secondary low pass filter and a secondary high pass filter receiving a signal from said reading means;

an attenuator connected to an output of said high pass filter and attenuating the same under control of said boost value;

an adder connected to outputs of said attenuator and first secondary low pass filter;

second and third secondary low pass filters connected in series to an output of said adder; and a primary low pass filter connected to an output of said third secondary low pass filter, each of said low pass filters and said high pass filter operating under control of said cut-off frequency.

9. A magnetic disc apparatus comprising:

a plurality of magnetic recording media on which information of circuit parameters regarding the recording and reproduction of information has previously been recorded;

a plurality of magnetic heads respectively provided for each of said magnetic recording media;

writing means for selecting any one of said plurality of magnetic heads and for writing information onto said magnetic recording medium;

reading means for selecting any one of the plurality of magnetic heads and for reading out the information from the magnetic recording medium;

an electric filter which is provided for said reading means having a cut-off frequency Fc of approximately 5 MHz or higher and a boost value Fb which determine transfer characteristics of said filter, wherein said electric filter executes a frequency domain waveform equalization to a read signal from the magnetic head, and said cut-off frequency and said boost value can be variably set by a signal from outside, table forming means for reading out the information previously recorded on the magnetic recording medium from said reading means at the start of the use of the apparatus and for forming a set value table in which optimum values of the circuit parameters including at least said electric filter have been stored for every said magnetic head, and control means for reading out the set values in said set value table corresponding to the designated head prior to the writing operation by said writing means or the reading operation by said reading means and for controlling the circuit parameters of a circuit section including the electric filter, wherein said table forming means has a ROM table in which circuit parameters which are used upon reading of the information have fixedly been stored, and after the circuit section is controlled by the circuit parameters stored in said ROM table, the table forming means reads out the information regarding the circuit parameters which have previously been recorded on the magnetic recording medium, said ROM table includes a plurality of kinds of circuit parameters which are used when the information is read, and, after the circuit section is controlled by the circuit parameters stored in said ROM table, the table forming means reads out the information regarding the circuit parameters which have previously been recorded on the magnetic recording medium, and when the information cannot be read out, the circuit section is controlled using other circuit parameters in the ROM table, and the reading operation is retried, said writing means executes a constant density recording of circuit read parameters such that a region from an inner rim cylinder to an outer rim cylinder of said media are divided into a plurality of zones and a recording frequency is variably changed for every zone at a frequency which is lower than an ordinary write frequency so that a physical recording length per unit information in each zone is set to a predetermined value and the information is written at a frequency lower than and ordinary write frequency, a circuit parameter adapted to the recording frequency of each zone to execute said constant density recording has previously been recorded on the magnetic recording medium, said table forming means forms the set value table in which the circuit parameter adapted to the recording frequency has been stored for every magnetic head and every zone, and said control means controls a circuit section to the circuit parameters in said set value table corresponding to the zone in which the designated magnetic head and a designated cylinder are included.

10. A magnetic disk apparatus comprising:

a recording medium having a plurality of zones, each of said zones having a corresponding read/write frequency different than that of other zones so that the recording density of each of said zones is substantially equal to that of all other zones, wherein parameter information is recorded in an innermost one of said tracks;

a plurality of data tracks in each of said zones;

a head disposed adjacent said recording medium;

writing means for writing data to said data tracks at the corresponding read/write frequencies defined by said zones;

reading means for reading data from said data tracks at the corresponding read/write frequencies defined by said zones;

an adjustable filter connected to said reading means; and control means for obtaining said parameter information from said one of said zones having the lowest read/write frequency using said reading means, said control means adjusting said filter according to said parameter information, whereby a reproduction clock frequency of said reading means for reading said parameter information is low to increase a probability of successfully reading said parameter information.

11. A magnetic disk apparatus according to claim 10, wherein said parameter information is for adjusting a boost value and a cut-off frequency of said filter.

12. A magnetic disk apparatus according to claim 10, further comprising a RAM for storing adjustment information for each of said plurality of zones on the basis of the parameter information obtained by said control means.

13. A magnetic disk apparatus according to claim 12, wherein said adjustment information is stored in said RAM prior to commencement of normal reading operations.

14. A magnetic disk apparatus comprising:

a recording medium having a plurality of zones, each of said zones having a corresponding read/write frequency different than that of other zones so that the recording density of each of said zones is substantially equal to that of all other zones, wherein parameter information is recorded in one of said zones having the lowest read/write frequency;

a plurality of data tracks in each of said zones;

a head disposed adjacent said recording medium;

writing means for writing data to said data tracks at the corresponding read/write frequencies defined by said zones;

reading means for reading data from said data tracks at the corresponding read/write frequencies defined by said zones;

an adjustable filter connected to said reading means; and control means for obtaining said parameter information from said recording medium using said reading means, said control means adjusting said filter according to said parameter information, whereby a reproduction clock frequency of said reading means for reading said parameter information is low to increase a probability of successfully reading said parameter information.

15. A magnetic disk apparatus according to claim 14, wherein said parameter information is for adjusting a boost value and a cut-off frequency of said filter.

16. A magnetic disk apparatus according to claim 14, further comprising a RAM for storing adjustment information for each of said plurality of zones on the basis of the parameter information obtained by said control means.

17. A magnetic disk apparatus according to claim 16, wherein said adjustment information is stored in said RAM prior to commencement of normal reading operations.

* * * * *

UNITED STATES PATENT AND TRADEMARK OFFICE
CERTIFICATE OF CORRECTION

PATENT NO. : 5,638,225
DATED : June 10, 1997
INVENTOR(S) : Tsuboi et al.

It is certified that error appears in the above-identified patent and that said Letters Patent is hereby corrected as shown below:

Column 1, line 57, delete "set the values" and insert --set to values-- therefor Column 2, line 25, delete "stored" and insert --for-- therefor Column 2, line 34, delete "stored" and insert --for-- therefor Column 2, line 40 delete "stored" and insert --for-- therefor

UNITED STATES PATENT AND TRADEMARK OFFICE
CERTIFICATE OF CORRECTION

Page 2 of 6

PATENT NO. : 5,638,225
DATED : June 10, 1997
INVENTOR(S) : Tsuboi et al.

It is certified that error appears in the above-identified patent and that said Letters Patent is hereby corrected as shown below:

Column 2, line 47, delete "stored" and insert

--for-- therefor

Column 2, line 58, delete "decide" and insert

--if-- therefor

Column 2, line 64, delete "an" and insert

--a-- therefor

Column 3, line 42, delete "very" and insert

--every-- therefor

Column 3, line 54, before "every" insert

--for-- therefor

UNITED STATES PATENT AND TRADEMARK OFFICE
CERTIFICATE OF CORRECTION

Page 3 of 6

PATENT NO. : 5,638,225
DATED : June 10, 1997
INVENTOR(S) : Tsuboi et al.

It is certified that error appears in the above-identified patent and that said Letters Patent is hereby corrected as shown below:

Column 3, line 59, before "every" insert

--for-- therefor

Column 4, line 7, before "every" insert

--for-- therefor

Column 4, line, 44 delete "an " and insert

--a-- therefor

Column 4, line 64, before "every" insert

--for-- therefor

Column 5, line 8, delete "a black diagram"

and insert --block diagrams-- therefor

UNITED STATES PATENT AND TRADEMARK OFFICE
CERTIFICATE OF CORRECTION

PATENT NO. : 5,638,225
DATED : June 10, 1997
INVENTOR(S) : Tsuboi et al.

It is certified that error appears in the above-identified patent and that said Letters Patent is hereby corrected as shown below:

Column 6, line 13, delete " an" and insert --the-- therefor

Column 6, line 61, delete "an" and insert --a-- therefor

Column 10, line 6, delete "every data numbers" and insert --for every data number-- therefor Column 10, line 14, after "table" insert --26-- therefor Column 11, line 43, delete "umbers" and insert --numbers-- therefor

UNITED STATES PATENT AND TRADEMARK OFFICE
CERTIFICATE OF CORRECTION

PATENT NO. : 5,638,225
DATED : June 10, 1997
INVENTOR(S) : Tsuboi et al.

It is certified that error appears in the above-identified patent and that said Letters Patent is hereby corrected as shown below:

Column 12, line 60, after "table" insert

--26-- therefor

Column 13, line 15, delete "is set to first"

and insert --is first set to-- therefor

Column 13, line 63, before "every" insert

--for-- therefor

Column 14, line 4, before "every" insert

--for-- therefor

Column 14, line 6, delete "constnats" and insert --constants-- therefor

UNITED STATES PATENT AND TRADEMARK OFFICE
CERTIFICATE OF CORRECTION

PATENT NO. : 5,638,225
DATED : June 10, 1997
INVENTOR(S) : Tsuboi et al.

It is certified that error appears in the above-identified patent and that said Letters Patent is hereby corrected as shown below:

Column 15, line 37, before "electric" insert --the-- therefor

Column 16, line 12, delete "means" (first occurrence) and insert --operation-- therefor Column 18, line 8, delete "and" and insert --an-- therefor Signed and Sealed this Fifteenth Day of September, 1998

Attest:

BRUCE LEHMAN

Attesting Officer

Commissioner of Patents and Trademarks